United States Patent [19]
Brief et al.

[11] Patent Number: 6,157,975
[45] Date of Patent: *Dec. 5, 2000

[54] APPARATUS AND METHOD FOR PROVIDING AN INTERFACE TO A COMPOUND UNIVERSAL SERIAL BUS CONTROLLER

[75] Inventors: David Brief, Ra'anana, Israel; Kent Bruce Waterson, South Portland, Me.

[73] Assignee: National Semiconductor Corporation, Santa Clara, Calif.

[*] Notice: This patent is subject to a terminal disclaimer.

[21] Appl. No.: 09/004,005

[22] Filed: Jan. 7, 1998

[51] Int. Cl.[7] .................................................. G06F 9/445
[52] U.S. Cl. ............................ 710/104; 710/8; 710/10; 710/12; 710/14; 710/19; 710/22; 713/100
[58] Field of Search .............................. 710/9, 10, 8, 12, 710/14, 19, 104; 713/100

[56] References Cited

U.S. PATENT DOCUMENTS

| | | | |
|---|---|---|---|
| 5,729,721 | 3/1998 | Bettelheim et al. | 395/557 |
| 5,751,951 | 5/1998 | Osborne et al. | 395/200.8 |
| 5,778,218 | 7/1998 | Gulick | 395/558 |
| 5,818,948 | 10/1998 | Gulick | 381/77 |
| 5,835,791 | 11/1998 | Goff et al. | 710/62 |
| 5,841,471 | 11/1998 | Endsley et al. | 481/231 |
| 5,848,293 | 12/1998 | Gentry | 710/5 |
| 5,875,351 | 2/1999 | Riley | 395/842 |
| 5,901,332 | 5/1999 | Gephardt et al. | 710/41 |

OTHER PUBLICATIONS

U.S. application No. 09/003,963, filed Jan. 7, 1998.
U.S. application No. 09/004,003, filed Jan. 7, 1998..
U.S. application No. 09/003,897, filed Jan. 7, 1998.
U.S. application No. 09/004,002, filed Jan. 7, 1998.
U.S. application No. 09/004,004, filed Jan. 7, 1998.
U.S. application No. 09/003,925, filed Jan. 7, 1998.
USB Feature Specification: Shared Endpoints; SystemSoft Corporation, Intel Corporation; pp. i–iii, 1–14; Dec. 4, 1997.
Universal Serial Bus Common Class Specification; SystemSoft Corporation, Intel Corporation; pp. i–v, 1–14; Nov. 4, 1997.
Universal Seril Bus Specification; Compaq, Digital Equipment Corporation, IBM PC Company, Intel Microsoft, NEC, Northern Telecom; pp. 1–268; Jan. 15, 1996.
8x930Ax, 8x930Hx Users Manual; Intel; pp. 6.1–10.1, Appendix B–D; 1997.

*Primary Examiner*—Ayaz R. Sheikh
*Assistant Examiner*—Tim Vo
*Attorney, Agent, or Firm*—Limbach & Limbach, LLP

[57] ABSTRACT

A method and apparatus for providing a programming interface to a Universal Serial Bus Device. The programming interface is partitioned so that an external controller does not handle intermediate transfers such as packet retry, handshake packets or intermediate response to error conditions. The programming model consists of a number of endpoint pipes, each of which can be configured to provide one of several functions.

28 Claims, 4 Drawing Sheets

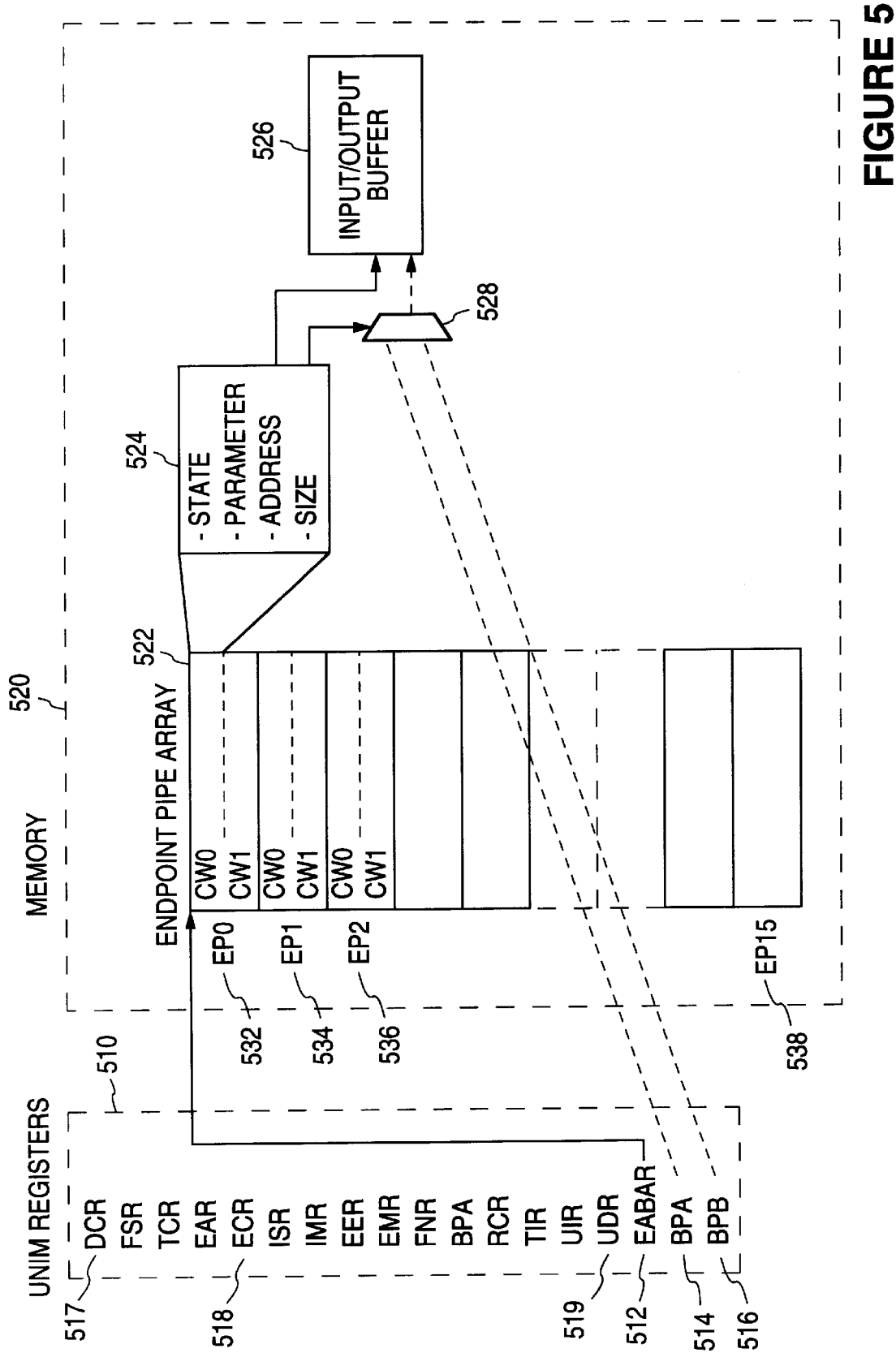

APPARATUS AND METHOD FOR PROVIDING AN INTERFACE TO A COMPOUND UNIVERSAL SERIAL BUS CONTROLLER

BACKGROUND OF THE INVENTION

1. Field of the Invention

This apparatus and method relates to providing an interface to a compound Universal Serial Bus controller and, in particular, to providing synchronization between a hardware interface module and the controlling software.

2. Description of the Related Art

Universal Serial Bus (USB) is a standard peripheral interface for attaching personal computers to a wide variety of devices: e.g., digital telephone lines, monitors, modems, mice, printers, scanners, game controllers, keyboards, and other peripherals. A USB thus replaces existing interfaces such as the RS-232C serial ports, parallel ports, PS/2 interface and game/MIDI ports.

In accordance with USB, all attached devices connect to a personal computer through a single connector type using a tiered-star topology. A host personal computer includes a single USB controller. The host controller provides the interface between the USB network and the host personal computer. The host controller controls all accesses to USB resources and monitors the bus's topology. A USB hub provides USB attachment points for USB devices.

The USB hubs and devices may be connected and disconnected without completely re-starting the USB network. Upon connection of a device or hub to an upstream hub the upstream hub will notify the host controller of a change in status. Following USB protocol, the host controller will enable the port of the hub to which the device is connected. The host controller will then assign a unique functional address to each device. Ports are enabled one at a time as the host controller 102 assigns unique furnctional addresses. Upon connection of a compound device, the host controller assigns a unique functional address to each device contained within the compound device.

A USB Function is a portion of a USB device that is able to transmit and receive information on the bus. A Function may have one, or more, configurations, each of which is made up of one of more endpoints.

An endpoint is the ultimate source, or sink, of data. An endpoint pipe provides for the movement of data between the USB and memory, and completes the path between the USB Host and the function endpoint. Up to 16 such endpoints are supported at any given time, for each functional address.

At initialization of an endpoint device, the host controller associates a pipe with the endpoint functions. The pipes allow the host controller to move data into and out of a host memory buffer to and from the endpoints. The USB implements two types of pipe communication modes: stream and message. Stream data does not have a defined USB structure. Message data does have a defined USB structure.

After the initialization process completes, endpoint pipes can be allocated to particular endpoints. Accordingly, devices which include a plurality of endpoint functions will be assigned a plurality of pipes (each associated with a particular endpoint).

Each endpoint is an addressable entity on USB and is required to respond to tokens from the USB host controller. Although a device may include a plurality of endpoint functions, those endpoint functions may not necessarily operate simultaneously. By way of example, a multi-function device may include a fax and a digital telephone function. During initialization, the multi- function device is assigned a unique functional address and the fax and digital telephone functions are each associated with distinct endpoint numbers. Out pipes for transmitting data to each function are likewise allocated during initialization. One out pipe is associated with an endpoint number for the fax function, and one out pipe is associated with an endpoint number for the printer function. A fax and digital telephone will each typically require an isochronous out pipe because their transactions should operate in real time.

The operation of a USB device typically involves an interface module, which connects to a USB network. The interface module includes a programming interface, which is accessible for operation of an endpoint function. The endpoint function passes data to an endpoint pipe so that it can be transmitted over a USB network. Likewise, the endpoint function receives data from an endpoint pipe for use by the function.

To perform such operations over a USB network the function must carefully coordinate the actions of the interface module. For example, the function must insure that bulk transfers are completed without error. This requires providing and accepting the appropriate handshakes with a host controller. The time a function spends on processing such handshakes limits its ability to perform other operations. Moreover, on a noisy USB network much of the data transmitted may be corrupted. This places additional burdens on the function, which must provide appropriate responses to corrupted data.

Accordingly a USB interface module is desired which provides an efficient programming interface to a function and which places a minimal processing burden on the function for responding to typical USB network conditions.

SUMMARY OF THE INVENTION

It is an object of the invention to provide an efficient interface to a function.

It is a further object to improve sychronization between the hardware of a USB device and the controlling software.

It is feature of one aspect of the invention to provide a programming model having well defined endpoint states.

It is a further feature of one aspect of the invention to provide an endpoint command register to control operation of an endpoint by a function.

It is an advantage of one aspect of the invention to automatically respond to data transactions without the intervention of a function.

It is a another advantage of one aspect of the invention to allow a function to setup all packets for a transaction simultaneously.

It is a further advantage of the invention to have a single easily expandable programming model to handle all types of endpoints and interfaces.

According to one aspect of the invention, a Universal Serial Bus interface module utilizes an endpoint pipe array for holding a control word for each of a plurality of endpoint pipes, wherein each control word includes endpoint pipe state information and an address for pointing to a memory buffer; and an endpoint command register for receiving commands from a Universal Serial Bus function wherein the endpoint command register has a first and second portion containing data representing an endpoint number and a command respectively, and wherein receipt of a command causes the interface module to change the endpoint pipe state information according to the command of an endpoint pipe indicated by the endpoint number.

According to another aspect of the invention, a device for connecting to a Universal Serial Bus utilizes a buffer having an IN bulk configuration, an OUT bulk configuration, an IN isochronous configuration, an OUT isochronous configuration, an interrupt configuration and a control configuration and wherein the configurations allow for dynamic changes; an interface module having a transceiver for connecting to a Universal Serial Bus and a programming interface wherein the interface module is operationally coupled with the buffer; and a function operationally coupled with the programming interface and with the buffer wherein the function commands the interface module to transmit and receive data to the buffer and the function moves received data out of the buffer and moves data into the buffer for the interface module to transmit and further wherein the interface module responds to packet retries, accepts and provides handshakes, and provides a responses to error conditions.

According to another aspect of the invention, a Universal Serial Bus device utilizes an interface configured to receive commands from a host all computer, a plurality of endpoint pipes, and a plurality or buffers. Each of the plurality of endpoint pipes is configurable to operate in a control, bulk, interrupt and X isochronous mode. The commands from the host computer dynamically select a mode of operation for each of the plurality of endpoint pipes. Each of the plurality of buffers is associated with at least one of the plurality of endpoint pipes. The commands from the host computer dynamically select a size for each of the plurality of buffers.

According to another aspect of the invention, a method of operating a Universal Serial Bus device includes receiving a plurality of commands from a host computer. A mode of operation is selected for each of a plurality of endpoint pipes based upon the plurality of commands from the host computer. The mode of operation for each of the plurality of endpoint pipes is selected individually. The mode of operation for at least one of the plurality of endpoint pipes changes based upon the plurality of commands received from the host computer. A buffer size for each of the plurality of endpoint pipes is selected based upon the plurality of commands received from the host computer. The buffer size for at least one of the plurality of endpoint pipes changes based upon the plurality of commands received from the host computer.

These and other objects, features, and advantages will become apparent when considered with reference to the following description and the accompanying drawings.

BRIEF DESCRIPTION OF THE DRAWINGS

FIG. 5 is a block diagram showing a preferred embodiment of a programming model for a Universal Serial Bus device.

DETAILED DESCRIPTION OF THE PREFERRED EMBODIMENTS

The invention described in this application is an aspect of a larger set of inventions described in the following co-pending applications which are commonly owned by the assignee of the present invention, and are hereby incorporated by reference: U.S. patent application Ser. No. 09/003,963, filed Jan. 7, 1998, entitled "Apparatus and Method for Implementing a Versatile USB Endpoint Pipe"; U.S. patent application Ser. No. 09/004,003, filed Jan. 7, 1998, entitled "Apparatus and Method of Implementing a USB Endpoint Pipe with Double Buffering Support"; U.S. patent application Ser. No. 09/004,004, filed Jan. 7, 1998, entitled "An Apparatus and Method for Transmitting and Receiving Data Into and Out of a Universal Serial Bus Device"; U.S. patent application Ser. No. 09/003,897, filed Jan. 7, 1998, entitled "Apparatus and Method of Transmitting and Receiving USB Isochronous Data"; U.S. patent application Ser. No. 09/004,002, filed Jan. 7, 1998, entitled "An Apparatus and Method for Handling Universal Serial Bus Control Transfers"; U.S. patent application Ser. No. 09/003,925, filed Jan. 7, 1998, entitled "An Apparatus and Method for Initializing a Universal Serial Bus Device".

Figure 1:
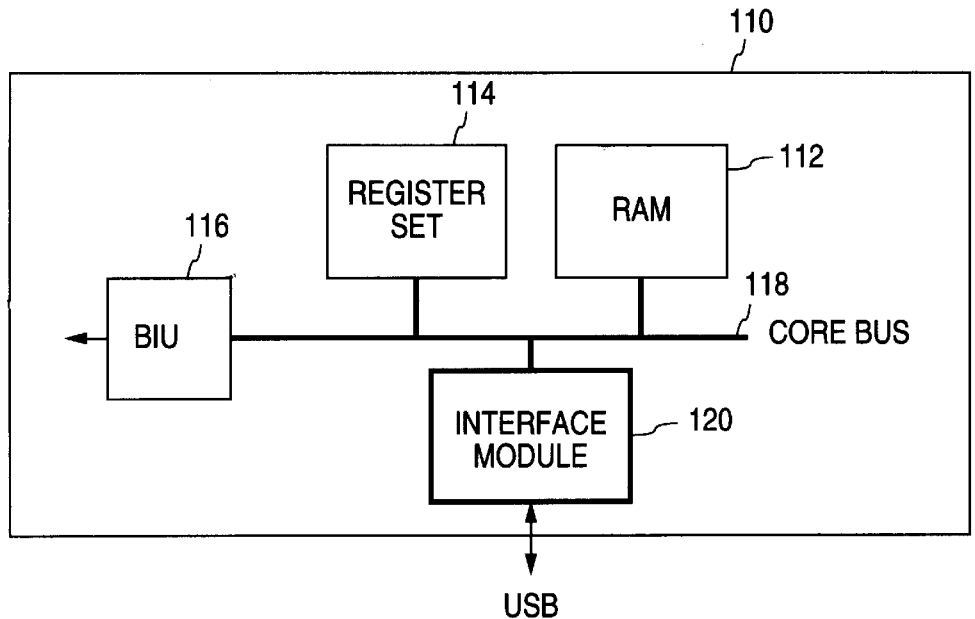
FIG. 1 is a block diagram of a USB device having an interface module in accordance with the present invention.

With reference now to FIG. 1, a USB device 110 in accordance with the invention is described. The preferred embodiment of the device meets Revision 1.0 of the USB Specification while providing a number of advantages over conventional USB devices. The USB device 110 includes a USB interface module 120, a register set 114, a RAM 112, and a Bus Interface Unit (BIU) 116. The interface module 120 connects to a USB network to send and receive data.

The interface module 120 also connects to register set 114, RAM 112, and BIU 116 via a core bus 118. The core bus 118 allows the interface module 120 to access the register set 114 and the RAM 112. The BIU 216 provides access to the core bus address space by performing read and write transfers as a master and register access as a slave. In addition, the BIU provides a data pipeline. The data pipeline may be used to temporarily hold data on its way to a memory location.

Figure 2:
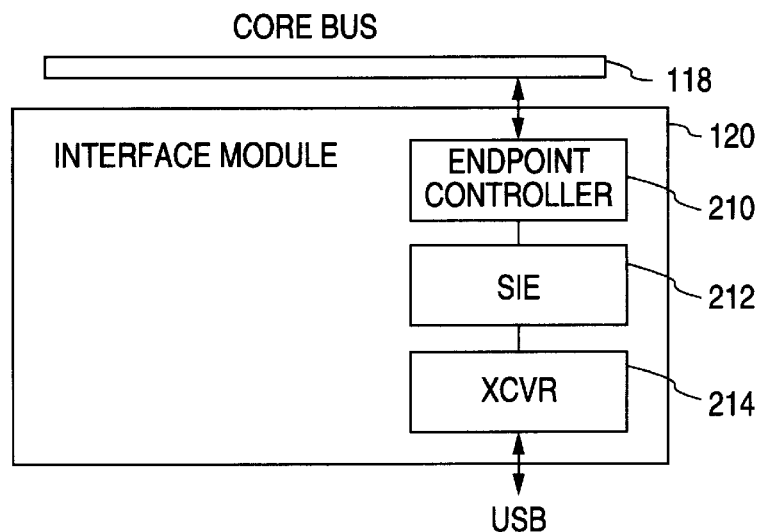
FIG. 2 is a block diagram of one preferred embodiment of an interface module for a Universal Serial Bus device in accordance with the invention.

Turning now to FIG. 2, the USB interface module 120 of FIG. 1 is described. The USB Interface Module 120 provides the interface for the USB device 110 to connect to a USB network. The interface module 120 includes an integrated USB transceiver 214, a serial interface engine (SIE) 212, and the endpoint controller 210.

The transceiver 214 provides the physical interface with a USB network. The transceiver includes both drivers and receivers, which comply with the physical layer specifications of Revision 1.0 of the USB Specification.

The serial interface engine 212 is operationally coupled with the transceiver 214 and is comprised of a physical (PHY) and a media access control (MAC) level. The physical level includes a digital-clock recovery circuit, a digital glitch filter, an End_Of_Packet detection circuit, and a bit-stuffing and de-stuffing logic circuit.

The media access control level includes packet formatting, cyclic redundancy check generation and checking, endpoint address detection, and provides the necessary control to give the NAK, ACK and STALL responses as determined by the end-point controller 210 for the specified endpoint pipe. The serial interface engine 212 is also responsible for detecting and reporting USB-specific events such as Reset, Suspend and Resume.

The endpoint controller 210 is operationally coupled with the serial interface engine 212 and provides the interface for USB function endpoints.

The endpoint controller 210 operates as a master and slave on the core bus 118 and supports all the USB endpoint classes: control, bulk, isochronous and interrupt. Slave access is used to access internal control registers of the register set 114, and master access is used to transfer data between endpoints and a RAM 112.

The endpoint controller 210 maintains separate state information for each endpoint pipe. State information required for immediate decisions, such as responding with a NAK or STALL handshake, is kept within the endpoint controller 210 at all times for each endpoint pipe. This information is used to direct the medium access control layer of the serial interface engine 212 to give the proper ACK, NAK, and STALL responses. Other information necessary for endpoint operation is kept in an endpoint array of the RAM 112.

Figure 3:
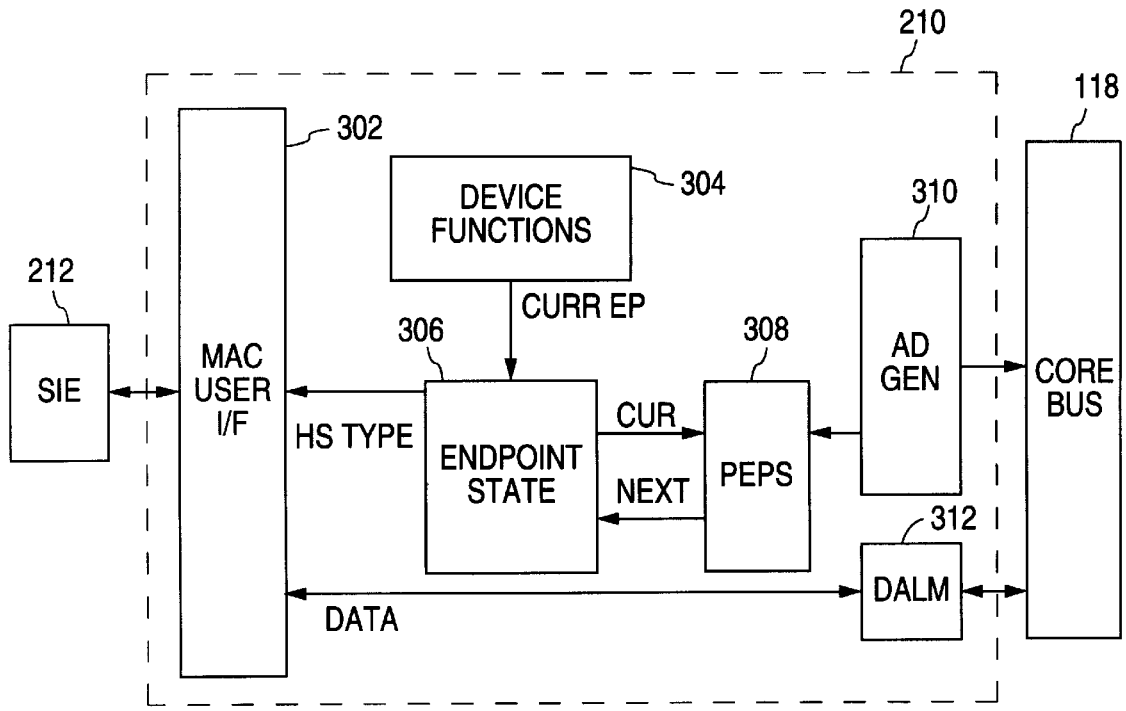
FIG. 3 is a block diagram of a preferred embodiment of the endpoint controller of FIG. 2.

Turning now to FIG. 3, the structure of the endpoint controller 210 will be described in greater detail. The endpoint controller 210 is comprised of several functional blocks. Specifically, the endpoint controller 210 includes a media access control interface 302, a device functions block 304, an endpoint state machine 306, a partial endpoint pipe storage (PEPS) 308, an address generator 310, and a data alignment multiplexor 312.

The medium access control interface 302 is coupled with the endpoint state machine 306 and the data alignment multiplexor 312 to provide the interface to the medium access control level of the serial interface engine 212. Some domains of the endpoint controller 210 operate using a clock on the core bus 118, other domains operate using a local clock of the endpoint controller 210. The media access control interface 302 synchronizes data bytes between the various domains with an asynchronous handshake for each byte transferred out of the endpoint controller 210.

The device function block 304 performs device functions such as address checking and generation. The device function block 304 is operationally coupled to the endpoint state machine 306 to provide such information in relation to the currently accessed endpoint pipe.

The endpoint state machine 306 performs the functions relating to maintaining the state of an active endpoint pipe. The state machine 306 maintains the state of an active endpoint pipe with well-defined transitions to synchronize hardware and software interactions. The current state is visible to a host controller via an endpoint state register. In the preferred embodiment, only one endpoint pipe is active at any given time. The endpoint pipe state machine 306 is, therefore, shared among all endpoint pipes.

The partial endpoint pipe storage 308 stores state information required for immediate decisions, such as responding with a NAK or STALL handshake, at all times for each endpoint pipe.

The address generator 310 provides the addresses necessary for use in reading and writing to the RAM over the core bus.

The data alignment multiplexor 312 provides the necessary data byte alignments before transfers on the core bus.

A preferred embodiment of the above mentioned endpoint pipe array will now be described in greater detail. Turning to FIG. 5, a preferred programming model is shown. This programming model shows a plurality of registers 510 that are used to control and monitor the operation of a USB device. The model also includes an endpoint pipe array 522 located in memory 520. The endpoint pipe array 522 is used to control endpoint parameters specific to a particular endpoint transfer.

Portions of the register set 510 and portions of the memory 520 coordinate to monitor and control a particular endpoint transfer. FIG. 5 also shows a preferred embodiment of the relationship between the register set 510 and the memory 520 in accordance with the invention.

The endpoint pipe array 522 includes a first control word CW0 and a second control word CW1 for each of sixteen endpoint pipes. The endpoint pipe array 522 is located in memory at an address stored in an endpoint array base address register (EABAR) 512. This endpoint pipe array is indexed by a four-bit endpoint pipe number, and by a one-bit endpoint pipe control word pointer. As shown, an endpoint pipe number of zero, EP0 532, points to the first pair of control words in the endpoint pipe array 522. Likewise, EP1 534 points to the second pair of control words; EP2 536 points to the third pair and so on. Endpoint pipe number EP15 538 points to the last pair of control words in the preferred embodiment.

The control words contain all the information required to operate an active endpoint pipe. As shown by block 524, each control word contains state, parameter, address, and size information for an endpoint pipe. There are two such entries for each endpoint pipe. The control word to be accessed next is determined by the endpoint pipe control word pointer, CWP, value.

Immediately after a IN, OUT or SETUP token is received to an endpoint pipe currently in a ready state, the control word of the selected endpoint pipe at the current control word pointer is read to determine how to respond to the token. At the end of a transfer, when completion status is written, the control word is updated with the current status, the CWP is incremented, and the other control word is read. When intermediate status is written, only the most significant byte of the control word is updated. The control word format is shown below:

| Bits | Function Label |
| --- | --- |
| 31–28 | Buffer State BS |
| 27 | (Reserved) |
| 26–16 | Buffer Address BA |
| 15 | Buffer Page BP |
| 14 | Buffer Rounding BR |
| 13 | Toggle Enable TE |
| 12 | Type Isochronous TI |
| 11 | Interrupt on Packet Complete IC |
| 10 | Interrupt on Packet Error IE |
| 9–0 | Byte Count BC |

The 4-bit buffer state BS is updated by software and the endpoint pipe controller (EPC) to synchronize the control of this buffer between them. EPC writes status indicating the use of the buffer. This field is set by node firmware to Output Ready, Input Ready, Setup Ready, Skip, Stall and Disable. All other values are set by the EPC. The EPC can also write the Stall and disable values in error conditions. The buffer can be reclaimed by node firmware when the buffer state is any of the Complete values; this includes the Input/Output Complete Status and the Error codes.

The buffer state BS can take the following values:

0: Skip. This value is used together with the Output Ready Command. Skip causes the next data packet received to be ignored and the control word pointer to be incremented. For control endpoints, this also causes the endpoint pipe state to switch from the input/ready state to the output/input Idle state. The setting of TE and TI determines which handshake is returned, and the next state of the endpoint pipe. A NAK is returned if neither TE or TI is set. If TI is set, and not TE, no handshake is returned. If TE is set, an ACK is returned and complete status is written when a packet with the proper PID is received.

1: Input Ready IRDY. This value indicates that the buffer has been written with data to transmit in response to an IN token.

2: Output Ready ORDY. This value indicates that the buffer has been allocated for writing.

3: Setup Ready SRDY. This value indicates that the buffer has been allocated for writing. This is used only on a Control Endpoint during the first transfer of control read and control write operations. Write only in control word 0.

4: Output Wait OWT. This value indicates that an error occurred while receiving OUT data from the host.

This includes detection of a bit stuff error. A retry is expected as this is considered intermediate status, except in the case of an isochronous OUT endpoint where it is treated as completion status.

5: CRC Error CRCE. This value indicates that a bad CRC was detected at the end of an OUT transaction. A retry is expected as this is considered intermediate status, except in the case of an isochronous OUT endpoint where it is treated as completion status.

6: Buffer Error BUFE. This value indicates that during an OUT, data was received faster from USB than it could be written to memory. During an IN, data was not read from memory fast enough to keep up with the USB data rate. A retry is expected on this endpoint.

7: Input Wait IWT. This value indicates that the buffer is being held by the endpoint controller and is waiting to try, or retry, to transmit this buffer at the next opportunity. This occurs in the case of a missed acknowledge.

8: Input Complete ICMP. This value indicates successful completion of this input operation. The buffer may be released.

9: Output Complete OCMP. This value indicates that the buffer is full of data and no error was detected.

10: Token Error TKNE. This value indicates that a token of the wrong type for the current context of this control endpoint pipe was received. If this was an output buffer, then the endpoint is halted. If this was an input buffer, a NAK is sent and the state of the other control word is examined. This is considered a completion status.

11: Isochronous Synchronization Error SYNE. This value indicates that data was received into a buffer with TE=1 and TI=1 but CWP was not equal to the LSB of the FNR. This is considered a completion status.

12: Data Error DATE. For OUT data, when CW.BR is not set and the amount of data received from the host was less than expected, or the allocated buffer was not big enough to store the OUT data. For IN data, this is set if a buffering error occurred and CW.TE was not set or CW.TI was set. This is considered a completion status.

13: (Reserved).

14: Halt. Causes the current endpoint pipe to enter its HALT state, or indicates that the endpoint has entered the HALT state.

15: Disable. Causes the current endpoint pipe to enter its DISABLE state or indicates that the endpoint has entered the DISABLE state.

The Buffer Address BA holds the eleven lower bits of the buffer address. Buffers must start on an aligned double-word boundary and can end on any byte boundary. At the end of a complete transfer, the residual value of the buffer address is written. At the end of incomplete transfers such as when the status is written to input or output wait, this field is not over-written. For OUT buffers, the first byte stored is the byte following the PID. Similarly for IN buffers, the address points to the first byte of data to be transmitted, i.e., the byte immediately following the PID in the packet. The CRC is automatically calculated and appended to the Packet, except when the IN token is received from the IS_RDY state and the control word did not have the IS field set to 1.

The buffer page bit, BP, selects between a buffer page A register, BPA 512, and a buffer page B register, BPB 516. The BP selects BPA in a zero state, and selects BPB in a one state for use as the upper memory address of the current input/output buffer.

The buffer rounding bit BR is used for out transactions. It indicates whether a received data packet may be smaller than the data buffer. When BR is zero, the data packet should exactly fill the defined data buffer. A buffer overrun or underrun status is given if the packet does not exactly fit in the buffer.

When read together with an output complete or data error buffer status, BR indicates the value of the received PID. Specifically, it is zero for DATA0 and 1 for DATA1.

Toggle Enable bit, TE, is used to compare the data packet identifier, PID, which has a value of either DATA0 or DATA1 with the Control Word Pointer for an OUT token, and is used to generate the data packet identifier for an IN token.

When TE is in a zero state, the data toggle PID is not checked on OUT transactions; the data toggle PID is generated based on the current value of the CWP in response to IN Tokens. The CWP is incremented (inverted) after each transaction, even if an ACK was not received. For Isochronous endpoints, OUT data is not written to memory until CWP is equal to the least significant bit of the Frame Number, FNR. This has no affect on data sent in response to IN tokens. Data Toggle should not be enabled for buffers allocated to receive data sent with the SETUP token.

When the TE is in a one state, the data toggle PID is checked on OUT transactions; the data toggle PID is generated based on the current value of CWP in response to IN Tokens. For OUT transactions, TE causes an ACK to be sent in response to out packets whose PID value (DATA0 or DATA1) does not match CWP. For IN transactions, CWP is incremented (inverted) after each transaction, only if an ACK handshake is returned in the response time-out period. For Isochronous endpoints, OUT data is always written to memory but if the least significant bit of FNR is not equal to CWP, the ISO sync error buffer state is written back.

Type Isochronous bit TI indicates whether the endpoint pipe is isochronous. When TI is in a one state the data is isochronous. When TI is in a zero state, the endpoint pipe may be a control, bulk, or interrupt endpoint pipe.

Interrupt on packet complete bit, IC, is set whenever the buffer status is written to input or output complete, on a packet error, or when the endpoint pipe is stalled.

Interrupt on packet error bit, IE, is set whenever the buffer state is written to one of the buffer error codes, or when the endpoint is stalled. When both IC and IE are set, CRC and bit stuff errors cause the associated buffers not to be reused in normal operation. This allows subsequent diagnostic evaluation of the associated buffer.

Byte Count bits, BC, indicate the size of the data buffer to be used. A buffer must start on an even double-word boundary, but can end on any byte boundary. For IN transactions, the BC indicates the size of the data to be transmitted. For OUT transactions, the BC indicates the size of the buffer in which data can be received. The BC may hold a zero to indicate a zero-length data packet. At the end of all complete transfers, the residual value of the byte counter is written. At the end of incomplete transfers, such as when the status is written to in-put or output wait, this field is not overwritten.

In a preferred embodiment, the endpoint command register, ECR 518, is a word-wide, read/write register. The ECR 518 is used to perform commands on a specified endpoint. Upon reset, this register is cleared. The ECR 518 register format is shown below:

| Bits | Function Label |
|---|---|
| 15–8 | (Reserved) |
| 7–4 | Endpoint Pipe Number (EPN) |
| 3–0 | Endpoint Command (CMD) |

The endpoint pipe number EPN determines the endpoint pipe on which the command is performed. In a preferred embodiment, this register can be implemented in the high-speed bus interface logic. The data is passed across the asynchronous interface. Two signals are passed back from the endpoint controller; one to indicate that the command was processed and that the command value should be cleared to "0", and another indicating that the command could not be processed and should be set to "F". The endpoint command CMD can take the following values:

0000: Complete. This value indicates that the previous command is complete and the endpoint controller is ready to accept another command.

0001: Input Enable (CMD.IENB). This value causes the specified endpoint pipe to enter the Input Idle state I_IDL from the Stall (Halt) or Disable state. The Control Word Pointer for the specified endpoint pipe is reset to 0. If the current state is not Disable or Stall, a "F" is returned to indicate that an illegal command was attempted on this endpoint and the command is ignored.

0010: Input Ready (CMD.IRDY). This value causes the specified endpoint pipe to enter the Input Ready state I_RDY if it is currently in the Input Idle state I_IDL. This command is issued after a control word with an Input Ready buffer state I_RDY is written into the endpoint array for the corresponding endpoint. This command does not cause the control word in memory to be read; instead, it permits it to be read in response to reception of an IN token. If the current state of the endpoint is not Input Idle I_IDL, the command is ignored. If the current state is one of the Output or Setup states or Disable or Stall, a "F" is returned to indicate that an illegal command was attempted on this endpoint.

0011: Input Isochronous Ready (CMD.ISRDY). This value causes the specified endpoint pipe to enter the Input Isochronous Ready state IS_RDY, if it is currently in the Input Idle state I_IDL. This command is issued after a control word with the Input Ready buffer state is written into the endpoint array for the corresponding endpoint. This command does not cause the control word in memory to be read; instead, it permits it to be read in response to reception of an IN token. It is expected that the type field of the control word (TI) is set to isochronous, but this is not checked. If the current state of the endpoint is not Input Idle I_IDL, the command is ignored. If the current state is one of the Output or Setup states or is Disable or Stall, a "F" is returned to indicate that an illegal command was attempted on this endpoint.

0100: Output Enable (CMD.OENB). This value causes the specified endpoint pipe to enter the Output Idle state O_IDL from the Stall or Disable state. The Control Word Pointer for the specified endpoint is reset to 0. If the current state is not Disable or Stall, a "F" is returned to indicate that an illegal command was attempted on this endpoint, and the command is ignored.

0101: Output Ready (CMD.ORDY). This value causes the specified endpoint pipe to enter the Output Ready state O_RDY if it is currently in the Output Idle state O_IDL. This command is issued after a control word with an Output Ready state is written into the Endpoint Array for the corresponding endpoint. This command does not cause the control word in memory to be read; instead, it permits it to be read in response to reception of an OUT token. If the current state of the endpoint is not Output Idle the command is ignored. If the current state is one of the Input states, Stall, or Disable, then a "F" is returned to indicate that an illegal command was attempted on this endpoint.

0110: Output Isochronous Enable (CMD.OSENB). This value causes the specified endpoint pipe to enter the Output Isochronous Idle state OS_IDL from the Stall or Disable state. The Control Word Pointer for the specified endpoint is reset to 0. If the current state is not Disable or Stall, a "F" is returned to indicate that an illegal command was attempted on this endpoint, and the command is ignored.

0111: Output Isochronous Ready (CMD.OSRDY). This value causes the specified endpoint pipe to enter the Output Isochronous Ready state OS_RDY, if it is currently in the Output Isochronous Idle state OS_IDL. This command is issued after a control word with an Output Ready state is written into the Endpoint Array for the corresponding endpoint. This command does not cause the control word in memory to be read; instead, it permits it to be read in response to reception of an OUT token. If the current state of the endpoint is not Output Isochronous Idle the command is ignored. If the current state is one of the Input states, Stall, or Disable, then a "F" is returned to indicate that an illegal command was attempted on this endpoint.

1000: Setup Ready (CMD.SRDY). This value causes the specified endpoint pipe to enter the Setup Ready state S_RDY. This command is issued after a control word with an Output Ready state is written into the Endpoint Array for the corresponding endpoint. This command does not cause the control word in memory to be read; instead, it permits it to be read in response to reception of a SETUP token. If the current state of the endpoint is not Stall or Disable, the command is ignored.

1001: Disable (CMD.DISAB). This value causes the specified endpoint pipe to enter the disabled state DISABLE. This occurs immediately from any state. If the endpoint pipe is currently active, status is written in the control indicating that the endpoint was disabled.

1010: Stall (CMD.HALT). This value causes the specified endpoint to enter the Stall state HALT from any state. This occurs immediately from any state. If the endpoint pipe is currently active, status is written in the control indicating that the endpoint was stalled. 1011–1101: Reserved. These values cause no action to be performed, and return 0.

1110: Toggle CWP. This value causes the Control Word Pointer to be toggled. This is used with control transfers with an odd number of packets sent or received during the data phase.

1111: Error. This value indicates that an illegal command was attempted on the current endpoint pipe for its current state, and that a new command may be accepted.

The part of the UDR 519 relevant to the invention of the present application is the 8-bit endpoint pipe state. This state is stored for each endpoint pipe that is returned for the currently indexed endpoint pipe. If an invalid endpoint pipe is indexed, 0 is returned. The ECR register format is shown below:

| Bits | Function Label |
|------|----------------|
| 7    | Control (CTL) |
| 6    | Control Word Pointer (CWP) |
| 5–4  | Reserved |
| 3–0  | Endpoint Pipe State (EPS) |

Control CTL: This is asserted if this endpoint pipe is capable of accepting control sequences involving the SETUP token. This bit is set after CMD.SRDY for this endpoint pipe is performed and remains set until the endpoint is Disabled. Control Word Pointer CWP: When the control word bit is 0, control word 0 of this endpoint in the endpoint array is accessed next. When the control word bit is 1, control word 1 for this endpoint is accessed next. This is set to 0 whenever the endpoint is enabled.

The endpoint pipe state EPS can take the following values:

| Value | State |
|-------|-------|
| 0  | Disabled DIS |
| 1  | Input Idle I_IDL |
| 2  | Input Ready I_RDY |
| 3  | Input Active I_ACT |
| 4  | Stalled HALT |
| 5  | Input Missed ACK I_MAK |
| 6  | Input Isochronous Ready IS_RDY |
| 7  | Input Isochronous Active IS_ACT |
| 8  | Setup Ready S_RDY |
| 9  | Output Idle O_IDL |
| 10 | Output Ready O_RDY |
| 11 | Output Active O_ACT |
| 12 | Setup Active S_ACT |
| 13 | Output Isochronous Idle OS_IDL |
| 14 | Output Isochronous Ready OS_RDY |
| 15 | Output Isochronous Active OS_ACT |

In a preferred embodiment, only one endpoint pipe is active at any given time.

In a preferred embodiment, each endpoint pipe maintains a state with well-defined conditions for transferring between the state that involve an implicit hardware/software synchronization. Endpoint pipe state transitions occur:

- on explicit software commands to an endpoint through the endpoint command register ECR;
- by reading the buffer status of the other buffer in the other control word for this endpoint at the end of a transfer; and
- as a result of events on USB such as receipt of IN, OUT and SETUP tokens and ACK handshakes.

FIG. 7 shows the simplified endpoint pipe state machine for handling of SETUP transactions. The current endpoint pipe state is visible in the endpoint state register, which is accessible through the USB Index and Data registers. In a preferred embodiment, at most one endpoint pipe is ever in any of the active states at any given time.

This allows sharing of the active state logic among all of the endpoint pipes.

An endpoint pipe can have the following states during a SETUP transaction, as shown in FIG. 7:

Disable: The DIS state 710 is entered upon reset, upon the disable command to this endpoint pipe, and upon detection of a disable state in the buffer state of a control word. Any token received to this endpoint pipe while in this state is returned with no handshake. Software intervention is required to remove the endpoint pipe from this state, typically through an enable command to one of the Idle states.

Halt/Stall: The HALT/STL state 770 is entered upon the stall command to this endpoint pipe, upon detection of a stall state in the buffer state of a control word, and upon certain error conditions. Any token received to this endpoint pipe while in this state is returned a STALL handshake to indicate that the endpoint is currently stalled. Software intervention is required to remove the endpoint pipe from this state, typically through an enable command to one of the Idle states.

Setup Ready: The S_RDY state 720 is entered after this endpoint pipe has been given a buffer in which to write data. This state is entered by a setup ready command after the appropriate word in the endpoint array is written, or upon detection of the setup ready buffer state.

Setup Active: The S_ACT state 730 is entered upon receipt of a SETUP token from the Setup Ready state. While in this state, data from the USB is written to memory. At the end of an output transfer, status is written to the control word at CWP, the CWP is inverted, and the other control word for this endpoint pipe is read. The appropriate transition is made based on the buffer state to the output idle, output ready, input idle, or input ready state depending on the type of control transfer and the buffer state read.

Input Idle: In the I_IDL state 750, the endpoint expects that a buffer will soon be allocated. A NAK handshake is returned in response to an IN token mapped to this endpoint pipe. No response is returned for OUT tokens from this endpoint pipe.

Input Ready: This I_RDY state 752 is entered via an Input Ready command to this endpoint pipe or upon detection of another Input buffer at the end of a transfer. The command should only be given after a buffer has been allocated to this endpoint by writing the control word at the appropriate location in the endpoint array. This control word should point to a data buffer with data to return to the host in response to the next IN token received to this endpoint pipe. The PID value is transmitted as DATA0 when CWP is 0 and DATA1 when CWP is 1.

Input Active: I_ACT state 754 is entered upon receipt of an IN token when the selected endpoint state is currently Input Ready. While in this state, data is transferred from memory to the USB. Upon completion of the data transfer, an ACK handshake should be received within 16 bit times. At the end of this time-out period, if an ACK was not received, the buffer wait status is written back to the control word. However, the address and byte counter are not overwritten because a retransmission will occur and the current values need to be used again. If an ACK is received, the buffer status along with the current value of the address and byte counter are written. Then the other control word on this endpoint is read to determine the next state of the endpoint to be used the next time a token is directed to this endpoint pipe. If this endpoint is being used for a control transfer a transfer to the output Ready or Output Idle state can occur to complete the status phase of a control read transfer.

Output Idle: In the O_IDL state 740, the endpoint expects that a buffer will soon be allocated. A NAK handshake is returned in response to an OUT token mapped to this endpoint pipe. No response is returned for IN tokens on this endpoint pipe.

Output Ready: The O_RDY state 742 is entered after this endpoint pipe has been given a buffer in which to write data.

This can be entered via an Output Ready command from the O_IDL state 740 after the appropriate word in the endpoint array is written, or upon detection of another Output buffer at the end of a transfer.

Output Active: The O_ACT state 744 is entered upon receipt of an OUT token. While in this state data from the USB is written to memory. At the end of an output transfer, status is written to the control word at CWP. If the transfer was not successful, i.e., a CRC or bit stuffing error was detected, this is written as the buffer status. If the transfer was successful, the output complete buffer status is written, CWP is inverted, and the other control word for this endpoint pipe is read. The appropriate transition is made based on the buffer state. If this endpoint is being used for a control transfer, a transfer to the Input Ready or Input Idle state can occur to complete the status phase of a control write transfer.

Figure 6:
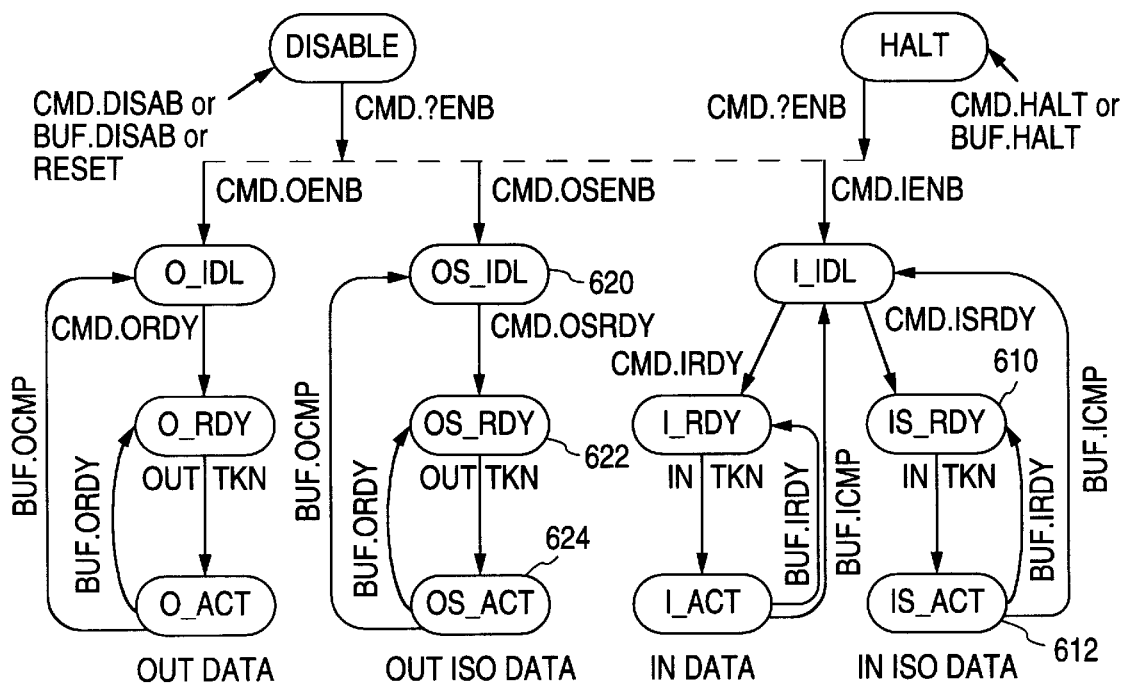
FIG. 6 is a flow chart showing a preferred embodiment of states and state transitions of an endpoint during a control transaction.

In addition to the above described states, the following states are used for IN and OUT data transactions as will be described with reference to FIG. 6:

Input Isochronous Ready: The IS_RDY state 610 is entered via an Input Ready command to this endpoint pipe or upon detection of another Input buffer at the end of a transfer. The command should only be given after a buffer has been allocated to this endpoint by writing the Control Word at the appropriate location in the Endpoint Array. This control word should point to a data buffer with data to return to the host in response to the next IN token received to this endpoint pipe. The PID value is always transmitted as DATA0 independent of the value of CWP.

Input Isochronous Active: The IS_ACT state 612 is entered upon receipt of an IN token when the selected endpoint state is currently Input Ready. While in this state data is transferred from memory to the USB. Upon completion of the data transfer, the buffer status along with the current value of the address and byte counter are written at the end of the transfer. Then the other control word on this endpoint is read to determine the next state of the endpoint to be used the next time a token is directed to this endpoint pipe.

Output Isochronous Idle: In the OS_IDL state 620, the endpoint expects that a buffer will soon be allocated. No handshake is returned in response to an OUT token mapped to this endpoint pipe. No data or handshake is returned for IN tokens on this endpoint pipe.

Output Isochronous Ready: The OS_RDY state 622 is entered after this endpoint pipe has been given a buffer in which to write data. This can be entered via an OSRDY command from the OS_IDL state after the appropriate word in the endpoint array is written, or upon detection of another Output buffer at the end of a transfer.

Output Isochronous Active: The OS_ACT state 624 is entered upon receipt of an OUT token from the OS_RDY state. While in this state, data from the USB is written to memory. At the end of an output transfer, status is written to the control word at CWP. If the transfer was not successful, i.e., a CRC or bit stuffing error was detected, this is written as the buffer status. If the transfer was successful, the output complete buffer status is written. At the end of the status transfer, CWP is inverted, and the other control word for this endpoint pipe is read. The appropriate transition is made based on the buffer state.

After reset, all of the endpoints are disabled. An endpoint is enabled by giving an enable command to an endpoint. This should only be done when input and/or output buffers will soon be allocated to this endpoint. All endpoints not currently mapped to an endpoint pipe are considered disabled.

Software allocates buffers to endpoints pipes on an as needed basis. After each buffer is allocated, it performs the input or output ready command on the endpoint pipe. If the endpoint pipe is currently in the Idle state, it enters the appropriate ready state. If the endpoint pipe is currently in a ready or active state, it ignores all commands except disable and stall commands to the endpoint pipe, which it handles immediately. Software must do this write in order to avoid potential synchronization problems since the UNIM endpoint pipe handling is asynchronous to the software operations.

Since up to two buffers can be allocated to each endpoint, the next buffer can be prepared while the current one is being processed to speed the data transfer and avoid unnecessary NAK handshakes.

A preferred embodiment of the invention further includes a mapping mechanism for tokens. Specifically, the endpoint controller 210 provides a mapping from the functional address, token type (IN, OUT, Setup), and endpoint number to one of the endpoint pipes. A preferred embodiment supports two fixed mappings to endpoint pipes. The selection of this mapping is controlled by the setting of endpoint pipe map select bits of a device configuration register which is located in the register set 114. A host controller may control the setting of the pipe map select bits.

Figure 4:
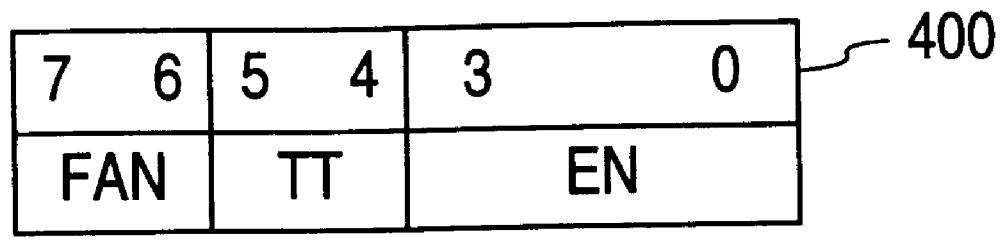
FIG. 4 is a block diagram of a preferred embodiment of a mapping register.

The endpoint controller 210 uses a token packet to generate a byte-wide pipe map index 400 which is shown in FIG. 4. Bits 0–3 of the pipe map index 400 are used to identify the endpoint number (EN). Bits 4–5 are used to identify the token type where 00 indicates an OUT token, 10 indicates an IN token, 11 indicates a SETUP token, and 01 indicates a SOF token. Bits 6–7 are used to indicate the least significant bits of the functional address.

Upon receipt of a token, the endpoint controller 210 generates the pipe map index 400. The endpoint controller 210 then accesses the endpoint pipe map select bits to select the appropriate mapping for the token.

One preferred embodiment of the USB device 110 supports two fixed mappings. Accordingly, the endpoint pipe select bits comprise a single bit. When the bit is in a first state, the token is mapped directly according to functional address and endpoint number. When the bit is in a second state, each of the first eight endpoints are mapped to two endpoint pipes, one for input and one for output.

By changing the endpoint pipe select bit, the host controller can change the mapping of endpoint pipes across functions. Thus, the host controller is able to configure a device to have multiple personalities. The host controller may then dynamically change the devices personality simply by accessing the endpoint pipe map select bits. This further allows the host controller to allocate endpoint pipes across functional address, token type and endpoint to where the endpoint pipe is most needed as a resource.

A preferred embodiment of such a device having a plurality of functional addresses maps all control functions together onto one endpoint pipe.

When a token is received, the endpoint controller 202 first maps the token to the appropriate endpoint pipe. When the token is mapped to an endpoint pipe with a buffer present, the endpoint controller 210 reads the appropriate control word. This control word tells the endpoint controller 210 how to complete the transaction. At the end of a transaction, the endpoint controller writes the control word with status which is used by software as an indication to release this buffer, and provide a new one.

In view of the forgoing descriptions, the operation of the device will now be described in greater detail from the view of controlling functional software. Initialization will first be described, followed by interrupt, bulk, isochronous, and control endpoints. After a module reset, a device appears as a non-attached device on USB. At this time, all endpoint pipes are disabled, and the functional state is reset. To allow the device to be detected as being attached to an upstream USB port, a node attached bit of the device control register is set. Once the device is attached, the endpoint pipe operation must be initialized. Depending upon the particular application, the software must determine how many endpoints are required for the application, the types of endpoints and the amount of memory that needs to be allocated for operation. Based on this, the EABAR, BPA and BPB are initialized. For each endpoint, two double words are allocated as control words. The EABAR pointer must fall on a 128-byte boundary. The BPA and BPB, if necessary, are allocated to provide the base pointer for all data transfers.

Since at this time it may not be clear exactly which endpoints are to be enabled, and how much memory is to be allocated to them, software need only load EABAR and BPA, so that the first control transfer can be processed. The software must then place an SRDY buffer in CW0 of endpoint pipe 0, and issue a SRDY command to the endpoint pipe. After this the state is set to the operational state. A setup received from a host is loaded then into the SRDY buffer.

After the setup has been received, it is parsed to determine how to respond. If this is a SET_ADDRESS setup packet, the functional address, FA, is loaded with the received address and the enable bit is set. The DEF bit is reset by hardware on the next ACK received in response to an IN token or on the next SETUP received by this endpoint in the case that the ACK was lost.

Upon receipt of an IN token, interrupt endpoints provide new interrupt information to the host when available. If no interrupt information is pending a NAK is returned. To initialize an interrupt endpoint pipe, software issues an Input Enable command to the appropriate input pipe. This causes the end-point pipe to enter its Input Idle, I_IDL, state. While in this state, a NAK is returned as the handshake in response to any IN token mapped to this endpoint pipe.

When interrupt data is available it is written into a buffer, and the next control word on the endpoint is written to IRDY and software issues a command to cause the endpoint pipe to enter the I_RDY state.

In response to the next IN token received, the control word at EABAR+EPN+CWP is read and the data is then transferred. If the toggle protocol is being followed, the toggle enable bit of the control word must be set in the control word. If this endpoint is being used for rate control feedback, the toggle enable bit need not be set. At the end of the transfer when the ACK from the host is received, completion status is written to the buffer. This provides confirmation to the software that the transfer has completed. If no ACK was received and toggle is enabled, an intermediate missed ACK status is written.

After the status is written, the other endpoint buffer is read. If this is a complete status, then the input idle state is entered. If, in the meantime, another event has occurred and another IRDY buffer was placed in the other control word, then it is read at this time and the endpoint enters the I_RDY state again.

Bulk Endpoints operate similar to the Interrupt Endpoints, except that typically larger data transfers are involved and they occur in both the IN and OUT directions. The Toggle protocol is always followed for Bulk End-points, so in all control words, TE is set. A particular bulk endpoint is used in either the input or output direction. To initialize a bulk endpoint, software issues an input or output enable command to the appropriate endpoint pipe number.

For bulk input endpoints, when data is available software should write it to a buffer, and issue a command to enter an IRDY state. The TE should be set. Software then issues an IRDY command. At most, two buffers of data can be pending on an endpoint pipe at any given time. This allows a double-buffer scheme if necessary to avoid sending any NAKs during a large data transfer. Software synchronization occurs by examining the buffer state. Only the complete buffer states can be overwritten. For bulk output endpoints, software must prepare a buffer in which to transfer received data. When this buffer is available, a control word with a pointer to it is written into the appropriate control word. The Toggle Enable bit should also be set here. Software then issues an ORDY command to the endpoint pipe.

After data has been received to this buffer as part of the OUT token, the control word in memory is updated.

If the size of the data packet is not known, the buffer rounding bit of the control word should be set. This allows packets smaller than the buffer size to be received and no error status is written. If the buffer rounding bit is not set, then packets received that do not exactly fill the allocated buffer are written with a data error status error. In all cases the data status error is written if more data than expected was received for this endpoint pipe. If an error occur is detected during reception of this data, an intermediate buffer state is written back to memory, and on the next OUT token the buffer is used again. Consequently, the software only needs to be concerned with the providing buffers in which to receive the data, not with the intricacies of the retry protocol.

Isochronous endpoints follow the programming model as bulk endpoints except they do not follow a toggle protocol. Instead they are synchronized to the least significant bit of the frame number register.

For input isochronous endpoints, data is queued using the same IRDY buffers. When an IN token is received on an isochronous endpoint, if the least significant bit of the frame number register matches the control word pointer, the data packet is sent. Otherwise, no data is sent. This allows the data transmissions to be synchronized to a particular frame number. To initiate transmission on a particular frame number, the frame number register can be read. Software can request an interrupt by the value of a frame number that needs to be matched. A match is done only on the lower eight bits. This allows queuing of this event up to 256 msec before receipt of the frame number over the USB network. When this interrupt is processed, software can queue the appropriate buffer on the endpoint pipe.

For output isochronous endpoints, the toggle enable bit determines how the LSB of the Frame number register is used. If toggle enable is not set, all data is written to memory. If, however, the least significant bit of the frame number register is not equal to CWP then a synchronization error status is written as the buffer state. If TE is set, data is only stored when the least signigicant bit of the frame number register is equal to the CWP. When synchronizing an output isochronous stream with the frame number, software can set the first buffer with TE so that writing only starts when there is a frame number match. Then all subsequent frames can detect if there is a synchronization error by simple comparison of the frame numbers.

The Frame number register will continue to count for up to two frames, even if the SOF is temporarily lost. Should the SOF become lost, for more than two frames an unlocked event is signalled to the software. In response, all subsequent isochronous transmissions should be treated with caution, or terminated, until the frame number counter becomes locked again.

Endpoint 0 is typically a control endpoint. In addition, the above described mapping mechanism allows other endpoints to become control endpoints. For a control endpoint, control word 1 and control word 0 should always be written together. For example, the SRDY for the next control transfer should be written together with the buffer or packet for the status transfer of the current control transfer. When an odd number of data packets are sent during the data phase of a control read or write operation, before the status phase is sent, software must adjust the control word pointer because the status phase must be put in control word 1 and the next SRDY buffer must be put in control word 0. To accomplish this software may insert a SKIP buffer, or issue a toggle CWP command. Software may then issue the ready command for the status phase buffer. Should a SETUP token be detected on a Control Endpoint for which an SRDY buffer is not currently available, a best effort is made to receive the SETUP token. While waiting for software to allocate a buffer, the SETUP token is stored in the data pipeline.

If a valid setup is received, an interrupt is asserted. In response to the interrupt, software should write a buffer on control word 0 and issue an SRDY command. This causes the pending setup to be written to memory. The SRDY command causes the endpoint to be considered a control endpoint, and remains set until an input enable or output enable command is performed. The SRDY buffer should be provided as quickly as possible because when the interrupt is asserted, it blocks the data path from any additional data transfers. While waiting for the buffer, all tokens received over the USB network are returned a NAK.

After a Setup is received, it must be reviewed to determine the appropriate response. At this point firmware puts on additional input or outputs buffers as appropriate. If the Setup is a command not supported by the function, a new SRDY buffer is put on control word 0 and the SRDY command is given. This causes all tokens on this endpoint to be returned a NAK handshake, until the next setup is received. In the interim period while software is analyzing the setup, NAKs are sent in response to the tokens.

Although the embodiments described herein are with reference to specific device structures, programming states, and programming models, the present invention can be applied to a variety of other device structures implementing different programming states and models without departing from the scope of the invention. Those having ordinary skill in the art will certainly understand from the embodiments disclosed herein that many modifications are possible without departing from the teachings hereof. All such modifications are intended to be encompassed within the following claims.

What is claimed is:

1. A Universal Serial Bus interface module for connecting to a Universal Serial Bus via a programming interface for a Universal Serial Bus function wherein the interface module comprises:

an endpoint pipe array for holding a control word for each of a plurality of endpoint pipes, wherein each control word includes endpoint pipe state information and an address for pointing to a memory buffer; and an endpoint command register for receiving commands from a Universal Serial Bus function wherein the endpoint command register has a first and second portion containing data representing an endpoint number and a command respectively, and wherein receipt of a command causes the interface module to change the endpoint pipe state information according to the command of an endpoint pipe indicated by the endpoint number.

2. The interface module of claim 1 wherein the interface module provides and accepts handshake packets according to the endpoint pipe state information.

3. The device according to claim 2 wherein the endpoint pipe array is configured to hold first and second control words for each of the plurality of endpoint pipes.

4. The device according to claim 3 wherein the interface module includes an interface for connecting to a plurality of memory buffers and wherein the first control word includes first endpoint pipe state information and a first address for pointing to a first memory buffer in the plurality of memory buffers and further wherein the second control word includes second endpoint pipe state information and an address for pointing to a second memory buffer in the plurality of memory buffers.

5. The device according to claim 4 further comprising an endpoint pipe array base address register containing data representing a base address of the endpoint pipe array and wherein the control words for an endpoint pipe may be accessed by an endpoint pipe number and the base address.

6. The device according to claim 5 further comprising a control word pointer register containing data having a first and second value wherein the first value points to the first control word and the second value points to the second control word and further wherein the control word pointer register has the first value when a packet identification is zero and has the second value when a packet identification is one.

7. A Universal Serial Bus interface module that connects to a Universal Serial Bus via a programming interface for a Universal Serial Bus function wherein the interface module comprises:

an endpoint pipe array that holds a control word for each of a plurality of endpoint pipes, wherein each control word includes endpoint pipe state information and an address that points to a memory buffer; and an endpoint command register that receives commands from a Universal Serial Bus function wherein the endpoint command register has a first and second portion containing data representing an endpoint number and a command respectively, and wherein receipt of a command causes the interface module to change the endpoint pipe state information according to the command of an endpoint pipe indicated by the endpoint number, wherein receipt of an input enable command causes said endpoint pipe to enter an input idle state from a stall state or a disable state.

8. The device according to claim 7 wherein receipt of an input ready command causes said endpoint pipe to enter a ready state.

9. The device according to claim 8 wherein receipt of an input isochronous ready command causes said endpoint pipe to enter an input isochronous ready state.

10. A Universal Serial Bus interface module that connects to a Universal Serial Bus via a programming interface for a Universal Serial Bus function wherein the interface module comprises:

an endpoint pipe array that holds a control word for each of a plurality of endpoint pipes, wherein each control word includes endpoint pipe state information and an address that points to a memory buffer; and an endpoint command register that receives commands from a Universal Serial Bus function wherein the endpoint command register has a first and second portion containing data representing an endpoint number and a command respectively, and wherein receipt of a command causes the interface module to change the endpoint pipe state information according to the command of an endpoint pipe indicated by the endpoint number, wherein receipt of an output enable command causes said endpoint pipe to enter an output idle state from a stall state or a disable state.

11. The device according to claim 10 wherein receipt of an output ready command causes said endpoint pipe to enter an output ready state.

12. The device according to claim 11 wherein receipt of an output isochronous enable command causes said endpoint pipe to enter an output isochronous idle state.

13. The device according to claim 12 wherein receipt of an output isochronous ready command causes said endpoint pipe to enter an output isochronous ready state.

14. A Universal Serial Bus interface module that connects to a Universal Serial Bus via a programming interface for a Universal Serial Bus function wherein the interface module comprises:

an endpoint pipe array that holds a control word for each of a plurality of endpoint pipes, wherein each control word includes endpoint pipe state information and an address that points to a memory buffer; and an endpoint command register that receives commands from a Universal Serial Bus function wherein the endpoint command register has a first and second portion containing data representing an endpoint number and a command respectively, and wherein receipt of a command causes the interface module to change the endpoint pipe state information according to the command of an endpoint pipe indicated by the endpoint number, wherein receipt of a setup ready command causes the endpoint pipe to enter a setup ready state from a stall state or a disable state.

15. A Universal Serial Bus interface module that connects to a Universal Serial Bus via a programming interface for a Universal Serial Bus function wherein the interface module comprises:

an endpoint pipe array that holds a control word for each of a plurality of endpoint pipes, wherein each control word includes endpoint pipe state information and an address that points to a memory buffer; and an endpoint command register that receives commands from a Universal Serial Bus function wherein the endpoint command register has a first and second portion containing data representing an endpoint number and a command respectively, and wherein receipt of a command causes the interface module to change the endpoint pipe state information according to the command of an endpoint pipe indicated by the endpoint number, wherein receipt of a disable command causes said endpoint pipe to enter a disabled state.

16. A Universal Serial Bus interface module that connects to a Universal Serial Bus via a programming interface for a Universal Serial Bus function wherein the interface module comprises:

an endpoint pipe array that holds a control word for each of a plurality of endpoint pipes, wherein each control word includes endpoint pipe state information and an address that points to a memory buffer; and an endpoint command register that receives commands from a Universal Serial Bus function wherein the endpoint command register has a first and second portion containing data representing an endpoint number and a command respectively, and wherein receipt of a command causes the interface module to change the endpoint pipe state information according to the command of an endpoint pipe indicated by the endpoint number, wherein receipt of a stall command causes said endpoint pipe to enter a stalled state.

17. A device for connecting to a Universal Serial Bus comprising:

a buffer having an IN bulk configuration, an OUT bulk configuration, an IN isochronous configuration, an OUT isochronous configuration, an interrupt configuration and a control configuration and wherein the configurations allow for dynamic changes;

an interface module having a transceiver for connecting to a Universal Serial Bus and a programming interface wherein the interface module is operationally coupled with the buffer; and a function operationally coupled with the programming interface and with the buffer wherein the function commands the interface module to transmit and receive data to the buffer and the function moves received data out of the buffer and moves data into the buffer for the interface module to transmit and further wherein the interface module responds to packet retries, accepts and provides handshakes, and provides a responses to error conditions.

18. The device according to claim 17 wherein the buffer further comprises a first and second portion for storing data packets and wherein the second portion is allocated after a first SETUP transaction.

19. A Universal Serial Bus device comprising:

an interface configured to receive commands from a host computer;

a plurality of endpoint pipes each of which is configurable to operate in a control, bulk, interrupt and isochronous mode, wherein the commands from the host computer dynamically select a mode of operation for each of the plurality of endpoint pipes; and a plurality of buffers each of which is associated with at least one of the plurality of endpoint pipes, wherein the commands from the host computer dynamically select a size for each of the plurality of buffers.

20. The Universal Serial Bus device of claim 19, further comprising a plurality of endpoints wherein at least one of the plurality of buffers is associated with more than one of the plurality of endpoints.

21. The Universal Serial Bus device of claim 19, further comprising a plurality of endpoint pipe maps wherein each of the plurality of endpoint pipe maps define an association between at least one of the plurality of endpoint pipes, a functional address and an endpoint number, and wherein the commands from the host computer dynamically select one of the plurality of endpoint pipe maps.

22. The Universal Serial Bus device of claim 21, further comprising a pointer configurable to identify one of the plurality of endpoint pipe maps and so that the commands from the host computer dynamically select a value for the pointer.

23. The Universal Serial Bus device of claim 21, further configured so that the commands from the host computer dynamically change the map for at least one of the plurality of endpoint pipes while maintaining a current map for at least one of the plurality of endpoint pipes.

24. A method of operating a Universal Serial Bus device comprising the steps of:
- receiving a plurality of commands from a host computer;
- selecting a mode of operation for each of a plurality of endpoint pipes based upon the plurality of commands from the host computer, wherein the mode of operation for each of the plurality of endpoint pipes is selected individually;
- changing the mode of operation for at least one of the plurality of endpoint pipes based upon the plurality of commands received from the host computer;
- selecting a buffer size for each of the plurality of endpoint pipes based upon the plurality of commands received from the host computer; and
- changing the buffer size for at least one of the plurality of endpoint pipes based upon the plurality of commands received from the host computer.

25. The method of operating the Universal Serial Bus device of claim 24, further comprising the step of associating a buffer with a plurality of endpoints.

26. The method of operating the Universal Serial Bus device of claim 24, further comprising the step of selecting one of a plurality of endpoint pipe maps based upon the plurality of commands from the host computer, wherein each of the plurality of endpoint pipe maps defines an association between at least one of the plurality of endpoint pipes, a functional address and an endpoint number.

27. The method of operating the Universal Serial Bus device of claim 26, further comprising the step of selecting a value of a pointer based upon the plurality of commands from the host computer, wherein the value of the pointer identifies one of the plurality of endpoint pipe maps.

28. The method of operating the Universal Serial Bus device of claim 26, further comprising the step of changing an endpoint pipe map for at least one of the plurality of endpoint pipes while maintaining a current map for at least one of the plurality of endpoint pipes.

* * * * *